United States Patent [19]

Chang

[11] Patent Number: 4,817,664

[45] Date of Patent: Apr. 4, 1989

[54] GAS PRESSURE REGULATOR

[76] Inventor: Zong-Shi Chang, P.O. Box 10160, Taipei, Taiwan

[21] Appl. No.: 187,914

[22] Filed: Apr. 29, 1988

[30] Foreign Application Priority Data

Nov. 30, 1987 [GB] United Kingdom ............. 8727975

[51] Int. Cl.$^4$ .............................................. F16K 17/00
[52] U.S. Cl. .................................... 137/458; 137/456
[58] Field of Search ................................. 137/456, 458

[56] References Cited

U.S. PATENT DOCUMENTS 2,698,026 12/1954 Roberts .............................. 137/458
4,195,656 4/1980 Kanerva .............................. 137/458

FOREIGN PATENT DOCUMENTS 53972 1/1947 France ................................ 137/456

*Primary Examiner*—Robert G. Nilson

[57] ABSTRACT

In a gas pressure regulator a switch valve is provided in a throttle nozzle between an inlet passage and a pressure sensing chamber containing a diaphragm controlling a lever arrangement. The pressure regulator is capable of both pressure reduction and automatic shut off if there is a leak due to gas line damage or other conditions. Preferably a restoring mechanism is provided to reset the regulator after its automatic shut off.

1 Claim, 2 Drawing Sheets

4,817,664

GAS PRESSURE REGULATOR

BACKGROUND OF THE INVENTION

Thomas E. Meacham, Jr. disclosed a "gas pressure regulator with under and over shut-off" in his Taiwan Utility Model Patent No. 28402, a corresponding U.S. patent application filed on: June 15, 1984 of Ser. No. 620,764, now U.S. Pat. No. 4,503,883, for automatically closing a gas valve in the regulator, which however has the following drawbacks:

1. Since a strong compression spring (110) tensions a lever (104) either upwardly to shut off the gas valve (58) when a higher gas pressure exists in chamber (20), as shown in his FIG. 3, or downwardly to shut off the valve (58) when a lower pressure exists in chamber (20) as shown in his FIG. 2, a manual operation must be always done to reset the opening of the valve (58).

2. It is very difficult to sharply reset the valve (58) by lifting or descending the rod (100) since too-much lifting may cause an upward posing as retained by the spring (110) as shown in his FIG. 3 or too-much descending may cause a downward posing as shown in his FIG. 2.

3. The construction and mechanism are very complex so that the elements of his device are difficulty assembled, operated and maintained.

The present inventor has found such drawbacks and invented the present gas regulator for overcoming these drawbacks.

SUMMARY OF THE INVENTION

One object of the present invention is to provide a gas pressure regulator comprising: a body and a cover defining an inlet passage, an outlet passage and a pressure sensing chamber containing a spring biassed diaphragm; a throttle nozzle connecting the inlet passage to the pressure sensing chamber; a switch valve comprising a needle biassed by a switch spring, engaged in the throttle nozzle, projecting into the pressure sensing chamber and having a flange with a sealing washer mounted thereon and located in the inlet passage; and a lever arrangement coupling the diaphragm to a member which can abut the end of the needle projecting into the pressure sensing chamber, the arrangement being such that when the flow volume in the outlet passage is greater than the flow volume in the inlet passage the diaphragm will move to cause the lever arrangement to release the needle, the force of the switch spring will cause the flange and sealing washer thereon of the switch valve to close the throttle nozzle and, since the flange is located in the inlet passage, subsequent rise of pressure in the inlet passage will cause the switch valve to close even more tightly thereby eliminating the possibility of the switch valve opening because of weakening elastic force of the spring due to wear.

Preferably the regulator includes a restoring mechanism in the cover and comprising a rod coupled to the diaphragm, a ring surrounding the rod and biassed towards the diaphragm by a spring, and a retaining element connecting the ring to the rod with a lost-motion coupling, the arrangement being such that, when an outward pulling force is applied to the ring the diaphragm will be pulled to a position in which the lever arrangement will act on the needle to open the throttle nozzle and when the pulling force is removed, the ring will return to its original position because of the force of the spring but the rod and diaphragm can remain in the position to which they were pulled due to the lost-motion coupling.

Such a regulator can not only detect and automatically shut off when there are large-volume leakages due to damage or abnormal conditions, but can also detect small-volume leakages when used with the main valve on a gas tank, and shut off at the instant a leak is detected whereas currently used leakage detectors have to be tested frequently and cannot shut off at the instant a leak is detected.

Even when the user does not know a leak exists and opens the main switch on the gas tank, the gas line will remain shut. It thereby warns the user about the leak to prevent further use.

Since, in effect, the invention only adds a switch valve to the tip of the throttle nozzle of an ordinary gas pressure automatically to shut off when leaks are detected, its structure can be simple and its cost of production low. It can have flexibility in use and need not be restricted by the angle of installation.

DETAILED DESCRIPTION

Figure 1:
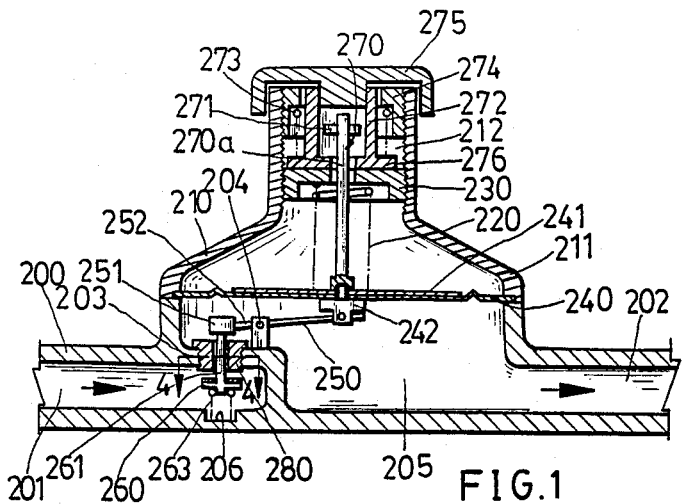
FIG. 1 shows a cross-sectional view of a gas pressure regulator according to the invention.
Figure 2:
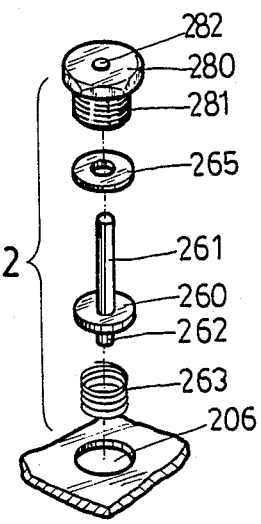
FIG. 2 shows plural elements at a flow passage as shown in FIG. 1.

Referring to FIG. 1, a gas pressure regulator comprises a body 200, a cover 210, a spring 220, a spring holder 230, a diaphragm 240, a switch lever 250, a switch valve 260 and a restoring mechanism 270. The gas pressure regulator of the invention is similar to a conventional gas pressure regulator but includes the switch valve 260 fitted in an inlet passage 201 and preferably also the restoring mechanism at the top of the diaphragm 240. It can have a structure which is very simple and of low cost. A throttle seat 280 is provided to make assembly of the flow passage easier. FIG. 2 shows a part of the throttle seat 280. At the lower part of the throttle seat 280 is a thread 281 to fit into a threaded hole 203 in the body 200. At the centre of the throttle seat 280 is a throttle nozzle 282 to receive a needle 261 extending from the switch valve 260. The switch valve 260 has a sealing washer 265 secured thereon and a downwardly projecting pin 262 to engage in a switch spring 263. Below the threaded hole 203, in the lower part of the body is a recess 206 to receive the lower end of the switch spring 263. The switch valve 260 drops when an external force is applied thereto, and due to the elastic force of the switch spring 263 it rises when the external force is reduced.

Figure 3:
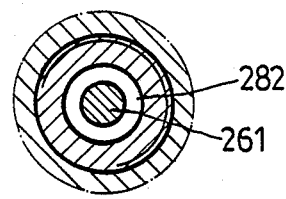
FIG. 3 is the view taken on line 4—4 of FIG. 1, showing a cross-sectional view of the flow passage.
Figure 4:
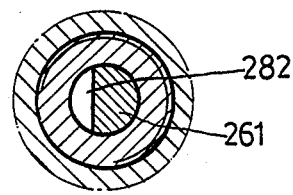
FIG. 4 is a view similar to FIG. 3 showing an alternative construction.

The outer diameter of the needle 261 can be smaller than the bore of the throttle nozzle 282 whereby gas can flow through an annular gap therebetween into a pressure reducing chamber 205 as shown in FIG. 3. Alternatively a part circular cut-away may be provided on the needle 261 to allow gas to flow as shown in FIG. 4.

The diaphragm 240 includes a connecting element 242 connected to a circular-metal plate 241 so as to strengthen the diaphragm 240. The connecting element 242 is connected to one end of the switch lever 250, and the other end 252 is fitted with a sealing member 251. The connecting element 242 is screwed to a rod of restoring mechanism 270.

The restoring mechanism 270 comprises a rod 270a, a ring 272, a spring 273, a spring holder 274, a top cover 275 and a retaining element 271. The ring 272 is formed a large-diameter disk 276 on its lower end which is formed with a rod hole 276a for reciprocatively moving the rod 270a. The hole 276a is smaller than a lateral length of the retaining element 271. On assembly the ring 272 is inserted through a threaded hole 212 in the top cover of the body 200 for upwardly pulling the retaining element 271 which is fastened to the tip of the rod and operatively carried by the disk 276. When the ring 272 rises because of external force, the rod will also rise but when the ring drops, the rod will not be affected. The spring 273 is inserted around the ring 272 and the spring holder 274 is screwed into the top cover of the body 200 through the threaded hole 212. The lower end of the spring 273 bears against the top of the large diameter disk 276 formed on a lower end of the ring 272 and the upper end of the spring 273 bears against a protruding part of the spring holder 274. The top cover 275 is connected to the ring 272. When the top cover 275 is pulled, the ring 272 acts on the retaining element 271 on the rod to cause the rod 270a to rise to a limit set by the spring holder 274. When released the ring 272 drops, due to the elastic force of the spring 273, to its original position but the rod 270a is not pulled down.

Figure 5:
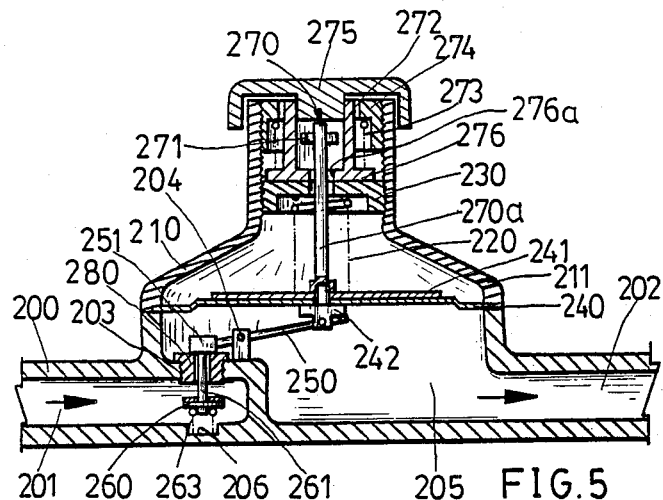
FIG. 5 is a view similar to FIG. 1 showing the positions of components when pressure rises in a pressure sensing chamber.

In operation of the regulator, when gas flow passing from the pressure sensing chamber 205 to an exit passage 202 is smaller than the flow volume set by the throttle nozzle 282, pressure in the chamber 295 rises. When pressure in the chamber 205 becomes stronger than the elastic force of the spring 220, the whole diaphragm 240 rises causing the switch lever 250 to pivot about a pivot axle 204. This action causes the sealing member 251 at the other end of the lever to drop, shutting off the throttle nozzle 282 as shown in FIG. 5. Since gas in the exit passage 202 continues to flow out, the pressure in the chamber 205 drops and becomes lower than the elastic force of the spring 220, causing the diaphragm 240 to drop. Since there is still some pressure remaining in the chamber 205, the diaphragm 240 remains lifted and does not drop to its base. The sealing member 251 at the other end of the switch lever 250 is thus raised partly allowing the switch valve 260 at the throttle nozzle 282 to rise due to the elastic force of the switch spring 263. Because the needle 261 is restricted by the presence of the sealing member 251, it only rises to a certain level allowing gas to continue to flow through the crevice between the needle 261 and the throttle nozzle 282 into the pressure sensing chamber 205 as shown in FIG. 1. Through these repeated actions pressure reduction is realized.

Figure 6:
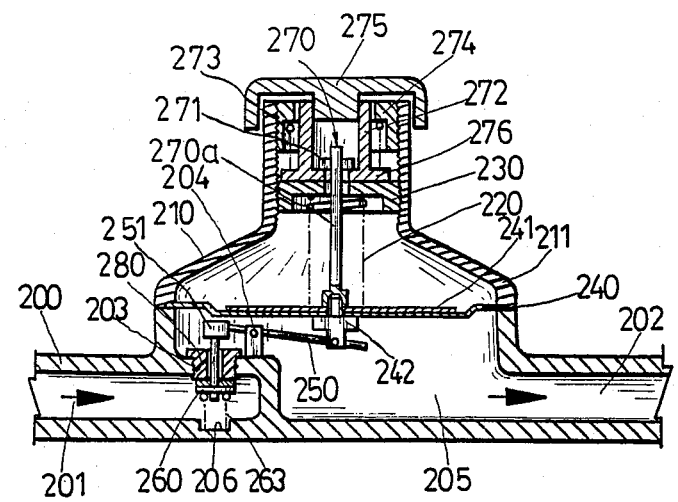
FIG. 6 is a view similar to FIG. 1, illustrating automatic shut off when there is a decrease in pressure due to damage in a gas line.
Figure 7:
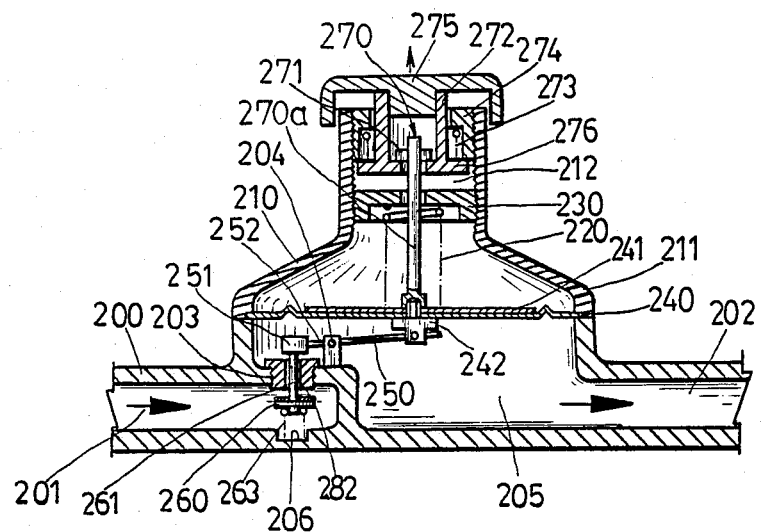
FIG. 7 is a view similar to FIG. 1 showing a resetting action when flow is to resume.

When gas flow volume in the exit passage 202 is higher than the flow volume set by the throttle nozzle 282 at the inlet passage 201 due to damaged gas lines or other conditions, gas pressure in the chamber 205 drops rapidly and the elastic force of the spring 220 forces the diaphragm 240 to drop to its base position. Because of the pivot axle 204, the sealing member 251 at the other end of the switch lever 250 rises to its highest position and the elastic force of the switch spring 263 causes the switch valve 260 to rise to its highest position causing the member 265 to shut off the throttle nozzle 282 as shown in FIG. 6. Because the switch valve 260 is an inner-lock type switch valve, when the pressure increases because of continued gas flow into the inlet passage 201 after the sealing washer 265 has shut off the throttle nozzle 282, the pressure increase causes the shut off to become even tighter thereby preventing accidents. When the gas line has been repaired, the top cover 275 of the restoring mechanism 270 can be pulled and because the ring 272 is restricted by the spring holder 274, this causes the rod to rise only to a certain height. The switch valve 260 is forced down by the switch lever 250 allowing gas to flow again into the chamber 205, and pressure is then increased. FIG. 7 shows the relative positions of the components when the top cover 275 has been pulled upwardly for resetting the switch valve 260 from the condition as shown in FIG. 6.

When the gas pressure regulator of the invention is used together with a main valve fixed on a gas tank, it can function like a gas line leak detector. To use it as a detector, the entry passage 201 is connected to the main valve, and the exit passage 202 is connected to a gas line leading to a gas appliance. When the main valve of the gas tank is closed and the gas appliance is switched off, then the gas line is in a noflow state but, pressure still exists in the gas line. This gas pressure will cause the switch valve 260 to drop and maintain the flow capacity. If the pressure drops in the gas line at the exit passage 202 due to a leak, the switch valve 260 will rise and shut off the passage to warn the user about the leak. Because the switch valve 260 is an inner-lock type switch valve, even if the user does not know about the leak and tries to open the main valve of the gas tank, gas will not flow out, this protects the user from possible accident.

Thus when used with the main valve of a gas tank, the regulator not only detects small volume leakages and shuts off, but also warns the user to prevent continued usage which might cause accidents.

Accordingly, this invention is superior to a conventional gas pressure regulator as disclosed by Thomas E. Meacham with the following advantages:

1. When it is intended to reset the valve 260 from a lower gas pressure in chamber 205 as shown in FIG. 6, it is easily operated by lifting the ring 272 and rod 270a. Afterwards, the valve 260 will be smoothly opened as acted by the two springs 220, 263.

2. After releasing a higher pressure in chamber 205 from a condition as shown in FIG. 5, the spring 220 will act the lever 250 to raise the sealing member 251 as assisted by an upward resilience force of the switch spring 263, so that the valve 260 will be automatically recovered (reset) without further operating the restoring means 270.

3. The members constructing the present invention are so simple for their easier assembly and convenient operation and maintenance.

I claim:

1. A gas pressure regulator, comprising: a body and a cover defining an inlet passage, an outlet passage and a pressure sensing chamber containing a spring biassed diaphragm, a throttle nozzle connecting the inlet passage to the pressure sensing chamber; a switch valve comprising a needle biassed by a switch spring, engaged in the throttle nozzle, projecting into the pressure sensing chamber and having a flange with a sealing washer mounted thereon and located in the inlet passage; a lever arrangement coupling the diaphragm to a member which can abut the end of the needle projecting into the pressure sensing chamber, the arrangement being such that when the flow volume in the outlet passage is greater than the flow volume in the inlet passage the diaphragm will move to cause the lever arrangement to release the needle, the force of the switch spring will cause the flange and sealing washer thereon of the switch valve to close the throttle nozzle and, since the flange is located in the inlet passage, subsequent rise of pressure in the inlet passage will cause the switch valve to close even more tightly thereby eliminating the possibility of the switch valve opening because of weakening elastic force of the spring due to wear, and a restoring mechanism formed in said cover operatively resetting the regulator after being automatically shut off; the improvement which comprises: said restoring mechanism including: a rod coupled to the diaphragm, a ring surrounding the rod and biassed towards the diaphragm by a spring, and a retaining element secured on a tip of the rod, said ring having a large-diameter disk formed on a lower end of said ring, said disk having a rod hole for reciprocativety moving said rod therethrough, said rod hole being smaller than a lateral length of said retaining element, whereby upon an outward pulling of the ring, the diaphragm will be pulled to a position since the retaining element of the rod is operatively carried by the disk and in which the lever arrangement will act on the needle to open the throttle nozzle and when the pulling force is removed, the ring will return to its original position because of the force of the spring but the rod and diaphragm can remain in the position as the rod hole in the disk freely passing said rod.

* * * * *